United States Patent Office 2,901,330
Patented Aug. 25, 1959

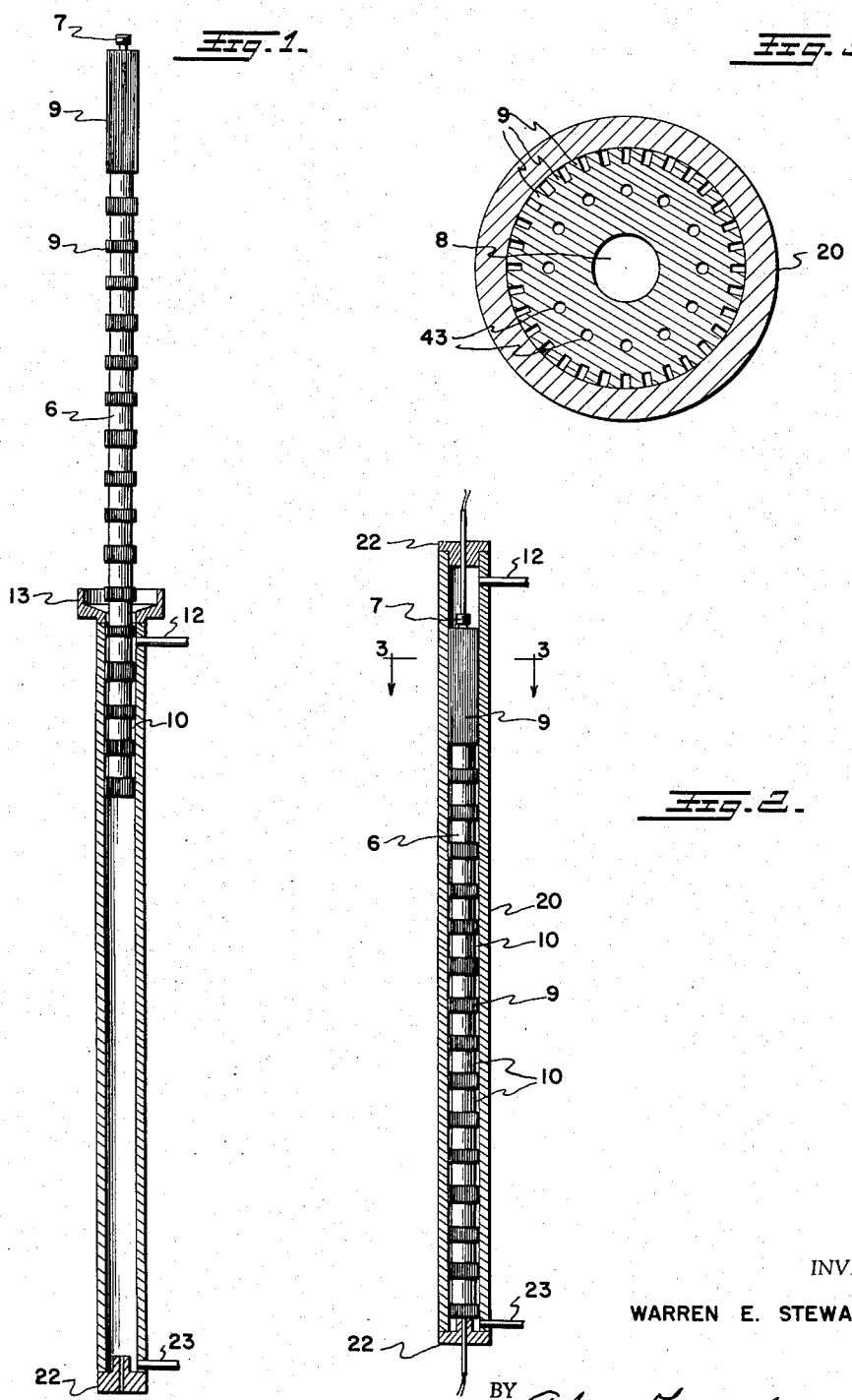

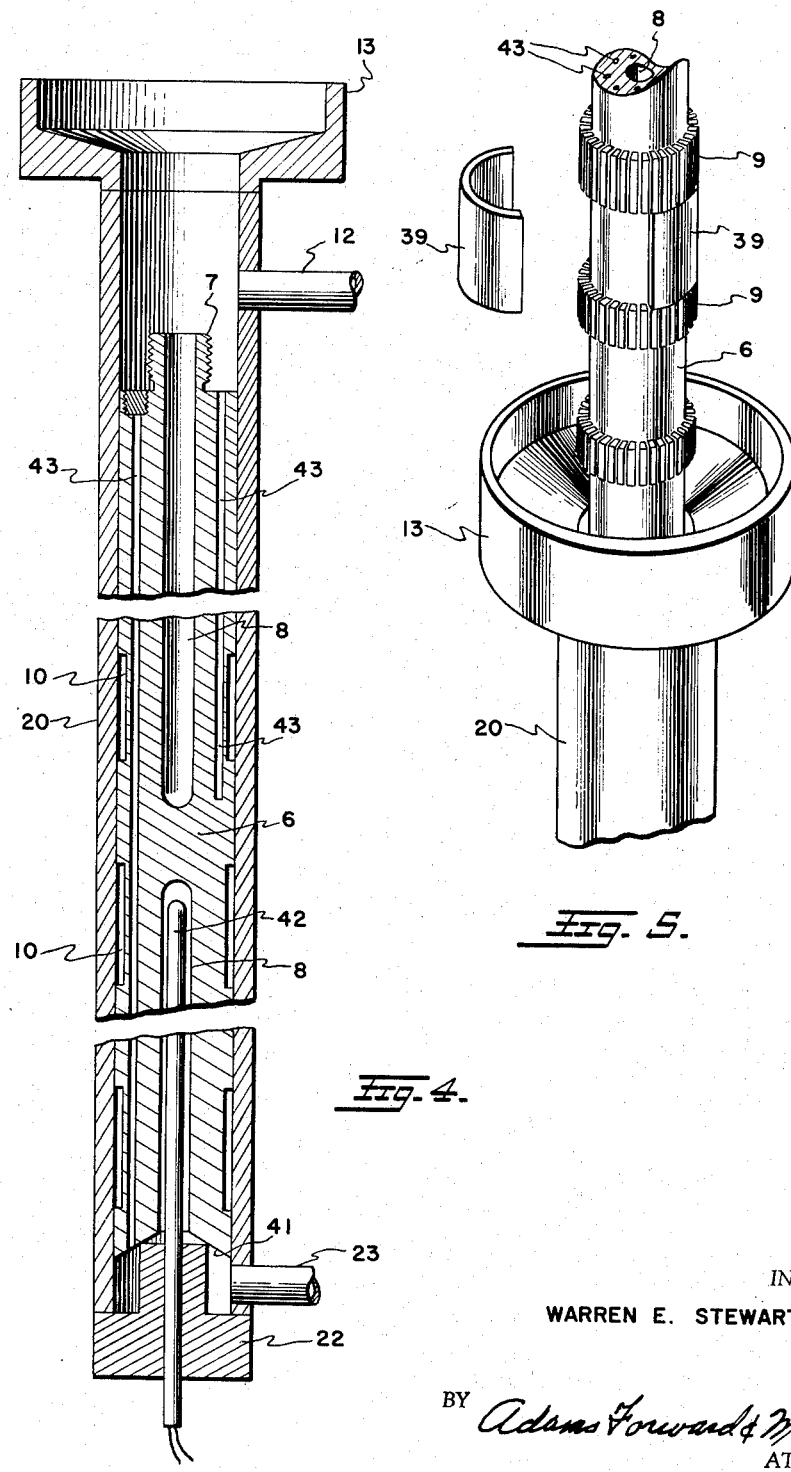

2,901,330

STATIONARY BED CATALYTIC APPARATUS

Warren E. Stewart, Park Forest, Ill., assignor to Sinclair Refining Company, New York, N.Y., a corporation of Maine Application May 23, 1955, Serial No. 510,440

6 Claims. (Cl. 23—288)

This invention relates to exothermic and endothermic chemical reactions wherein close temperature control is required. More particularly this invention relates to a novel apparatus designed to carry out effectively endothermic and exothermic reactions which are characterized by need for close temperature measurement and/or temperature control.

Temperature measurement and control in a system where exothermic or endothermic chemical reactions occur are limited by heat transfer rates. In such cases, it is important to distinguish between two classes of heat transfer: that which occurs between a catalyst and the surrounding fluid (which I refer to as interphase heat transfer) and that which occurs between the reactor wall and various interior points (long-range heat transfer). Depending on the particular situation and whether a catalyst is used, one or both types of transfer may be limiting. Thus, the efficiency of interphase transfer is favored by high mass velocity and small particle size, while the efficiency of long-range transfer is favored by high mass velocity and a small thickness of reaction zone. The ideal situation, based on heat transfer considerations alone, is approached at very high mass velocity with a reaction zone only slightly thicker than the catalyst particles. In practice, the mass velocity tends to be limited by considerations such as pressure drop or the length of reactor required to obtain a desired degree of reactant conversion; however, the ideal thickness of reaction zone is substantially achieved by the present invention.

The present invention is based on a consideration of several possible reactor geometries: a slab-shaped space bounded by planes, a cylindrical tube, and a cylindrical or tapered annular space. Comparison of the three shapes was made assuming equivalence of the minimum dimension, i.e. the thickness of reaction zone. On this basis, the slab-shaped space is least desirable because of constructional difficulties, possible maldistribution of flow near the edges, and the possibility of the walls warping at high temperatures. The cylinder is the simplest to construct and permits the best particle-to-wall contact for the usual particle shapes, but its greater length per unit of reactor volume is a distinct handicap when dealing with large catalyst charges. The annular reactor is intermediate between the slab and cylinder in performance and simplicity of construction; it was chosen here because of its ample charge capacity per unit length, and the ease of controlling the distribution of catalyst charge. The present invention relates to an improved generally cylindrical annulus reactor.

One problem encountered in the art employing cylindrical annulus reactors is that of charging granular solids or catalyst particles in a thin annulus. To avoid bridging and consequent poor distribution of the charge it has been necessary in the prior art to use an annulus thickness at least several times the particle diameter. The use of such a thickness, of course, adversely affects the problem which the adaptation of a cylindrical annulus reactor was meant to overcome; that is, the greater the thickness of the reaction zone the less efficient the heat transfer characteristics of the reactor become as a result of the decrease in the surface to volume ratio.

By the present invention I provide an annulus reactor characterized by ease of charging the granular solids or catalytic particles to the reactor spaces. My invention also provides an annulus reactor characterized by greatest possible ease of charging in that embodiment having the maximum heat transfer characteristics, that is with an annulus reaction space approaching the ultimate minimum thickness of one particle diameter.

The advantages of my invention will be understood by referring to the following description of the invention in conjunction with the appended drawings, in which:

Figure 1 is a vertical elevation of a preferred embodiment of my reactor in charging position;

Figure 2 is a vertical elevation of an embodiment of my reactor in charged position prepared for carrying out a reaction; and Figure 3 is a horizontal cross-section taken across lines 3—3 of Figure 2; and Figure 4 is a vertical cross-section of an embodiment of my invention showing the reactor at the completion of charging; and Figure 5 is a perspective fragmentary view with parts exploded of an embodiment of my invention showing the reactor in partially charged position.

Referring to the drawings, my reactor comprises a generally cylindrical hollow tube or shell 20, having a lower end closure member 22 and which may be constructed of any suitable material, for example, steel or other material having high thermal conductivity. The shell 20 can be provided with screw threads or the like (not shown) to receive a top closure member if desired, or the shell can be adapted to employ a conventional flanged top and a yoke at the bottom to effect closure. Communicating with the tube 20 at its lower end is a conduit 23 through which materials to be treated in my reactor are charged, for example, hydrocarbon fractions, or products are removed, depending upon the direction of flow employed. While only one conduit is shown, if desired a plurality of conduits can be spaced symmetrically about the tube.

Within tube 20 a cylindrically shaped plug 6 is removably mounted. Plug 6 can be of a size such that it extends throughout the entire length of the tube 20 or throughout a portion of the length, depending upon the use contemplated. Along its length, plug 6 is spaced away from tube 20, the diameter of plug 6 being less than that of tube 20 by at least two diameters of the particles to be employed as contact material. Thus the width of the annulus between the plug 6 and tube 20 is greater than one diameter of the particles to be employed as contact material. Advantageously, plug 6 is provided with a threaded end member 7, or if desired a threaded recess, so that it can be removably connected to a means (not shown) adapted for preheating purposes or for removing the plug from the tube. Centrally disposed in plug 6 are thermowells 8 (Figures 4 and 5) adapted to receive temperature indicating means 42, i.e. thermometers or thermocouples, to facilitate temperature measurement and control. The entrance of the lower thermowell 8 is advantageously tapered, as at 41, to guide the temperature indicating means into the thermowell.

Radially disposed about plug member 6 on a plurality of levels are fin-like projections 9 (refer especially to Figure 5). Radial fins 9 in the same horizontal plane advantageously are spaced from one another at a distance which does not exceed the minimum dimension of one particle of catalyst or granular solids employed within the annulus reactor. Desirably, the upper surfaces of finlike members 9 on each of the levels about plug 6 are all in substantially the same horizontal plane; similarly, it is desirable that the bottom surfaces of each of the fin-like projecting members 9 in any given plane are in a second common horizontal plane. These longitudinal fin-like radially projecting members 9 define, when considering plug member 6 from a vertical cross-sectional point of view, the upper and lower surfaces of ring-shaped or annulus reaction spaces 10 about the plug (refer especially to Figure 4). The over-all reaction spaces of my novel annulus reactor thus are defined by the walls of plug 6 between adjacent layers or levels of fin-like projections 9 and the corresponding facing portion of the tube member 20 when the reactor is in the charged or operative position as in Figures 2 and 4. Advantageously, there are a plurality of annulus or ring-like reaction spaces 10 about the length of my reactor. A conduit 12 advantageously is located in the upper end portion of tube 20 to permit introduction of charge stock or removal of product depending on direction of flow employed. Desirably conduits 12 and 23 communicate with the tube at points beyond the extremities of the plug 6 rather than at points facing the fins or the defined reaction spaces. It is within the scope of my invention to perform the functions of end closure members with suitably modified feed and product conduits, e.g., conduits 12 and 23 could be aligned and connected axially to tube 20. The latter arrangement may provide a more uniform flow distribution, particularly near the upper and lower extremities of the plug 6.

While the levels of fins 9 about plug 6 are shown to be substantially equally spaced from one another it should be understood that other spacing can be employed depending upon the problem involved. Thus in cases having widely varying reaction rates, as for example a reaction having an induction period which then progresses with rapidity, it may be desirable to have longer spaces where initial contact is effected with the subsequent spaces being shorter thereby limiting catalyst contact and increasing the percentage of time the reactants contact the fins. This can also be accomplished by providing uniform particle spaces and varying the length of the fins in the different levels. Moreover, where temperature measurement and control is critical for only part of the reaction time, a plug can be employed for that part of the reaction tube requiring careful control of catalyst charged and the remainder of the tube not occupied by the plug can be filled with particles or can remain empty.

The ease of charging my reactor can be understood by considering the invention as described especially in connection with Figures 1 and 5. In Figure 1 a funnel 13 is provided which is adapted to fit tightly on top of tube 20 and receive within its lower circumference the plug 6. As shown in Figure 1, plug 6 is placed within the funnel on top of tube 20 in the position such that plug 6 barely enters tube 20. Catalyst particles or granular solids to be placed within the reactor are then poured into funnel 13. The catalyst completely fills each annulus space 10 of plug 6 to the extent that such space is both below and accessible to the surface of catalyst in the funnel during passage of plug 6 through the funnel. To avoid destroying the size relationship employed, I prefer to put particles in the funnel in an amount sufficient to fill but one slot or space at a time; then particles are not sheared by being caught between descending fins and the edge of the hole in the funnel. By advancing the plug 6 downwardly into tube 20 when the funnel is charged, additional spaces 10 are exposed to catalyst poured into the funnel and are filled, and at the same time the previously filled annulus spaces 10 move into the reactor. It will be seen that such advancement of the plug 6 can be continued until the entire plug 6 is within the reactor, and the mere act of advancing the plug through the catalyst particles results in charging the reactor. As the plug advances through the funnel, it is advantageous to tap the shell 20 gently to aid in obtaining uniform and compact particle layers. In cases where less than the maximum catalyst charge is used, it may prove advantageous to charge the zones unequally to better distribute the heat of reaction along the length of the plug. It may prove advantageous in other cases, to distribute small catalyst charges over a portion of the available slots, leaving other slots empty, or filling unused slots with any suitable inert material which may be granular or machined to fit the spaces, such as the split rings 39 shown in Figure 5. By such means, the extent and distribution of thermal reactions along the plug can be controlled over a wide range.

The embodiment of my reactor minimizing the size of spaces 10, that is, limiting their maximum dimension in the horizontal plane to slightly more than one particle diameter, effectively eliminates bridging and other poor distribution of catalyst particles when the reactor is in the operative position.

While plug 6 has been described as comprising a generally cylindrical body having a plurality of radially positioned fin-shaped generally rectangular projections 9 disposed about said cylindrically shaped member on each of a plurality of levels about it, advantageously this plug member can be constructed by circumferentially machining a generally cylindrical body at several places about its length so that annular or ring-like spaces are left. At this point a second machining operation is conducted whereby slots are made in each of the annular projections remaining about plug member 6. While the longitudinal spacing of the rib-like projections 9 can be varied considerably, a space equivalent to about 20 to 40 times the horizontal measurement has been found to be advantageous. Since the catalyst is present in the space 10, the longitudinal dimension must of course be at least as great as the minimum dimension of one particle of catalyst.

The fins described have a plurality of functions. Firstly, during charging and discharging of the reactor, the fins facilitate moving the catalyst or other particles. In the charged position, support for the solids in each space is obtained from the fins. The fins serve to center the plug 6 within tube 20 since the diameter of the plug between the fins is materially less than that of the tube. Additionally, contact between catalyst and fins, fins and plug, and fins and the tube improve the heat exchange characteristics of the reactor. The plurality of fins in each level serves to distribute the fluids flowing through the reactor so that channeling and the like are avoided.

In another embodiment of my invention plug 6 can be provided with internal heating or cooling means for further improvement of temperature control. For such embodiment, a plurality of passages 43 (refer to Figures 3 and 4) can be provided in the plug 6 close to the surface for the passage of a suitable heat exchange fluid or to receive heating elements, if used. When such a plug is employed, the plug and any end closures would be modified accordingly to provide for the circulation of the fluid and to prevent flow of reactants and products through the passages 43. When the passages 43 are not in use, they can be closed by use of a suitable closure means to prevent flow from by-passing the catalyst.

My novel reactor, as pointed out above, operates most efficiently and effectively when employing spaces which are not materially greater, considering the horizontal dimension, than the minimum of one particle diameter. Particle diameter as used in the specification is intended to indicate the minimum over-all dimension of catalyst particles or other granular solids employed in fixed bed conversion processes, and generally is of the order of $1/32$ to $5/32$ of an inch. It is possible, however, to use my reactor and obtain the advantages above described with the finer particle sizes of the order of those employed in fluid catalyst conversion operations. For example, a fibrous or granular inert material can be mixed with catalyst fines and introduced simultaneously into the charging funnel. Upon passage of the tube through the funnel the spaces 10 will collect both catalyst fines and the inert material with the result that the catalyst fines will be retained within the annulus spaces by the larger fibrous or granular material. Alternatively, for downflow operation, a fibrous or granular material can be charged separately on any given level of the plug by hand or with the same or a second coaxial funnel and the finer particles can then be charged on top of the supporting material. Suitable inert materials such as glass wool, tabular alumina and the like can be employed. Advantageously such coarse materials are introduced into the annulus space nearest the exit of the reactor at all times, rgeardless of the size of materials being employed, to prevent loss of catalyst fines whether originally charged or produced in the reactor.

In operating my reactor, for example, in a dehydrogenation process, a catalyst such as platinum-on-alumina is charged as described above. A hydrocarbon feed is passed, in mixture with recycled hydrogen-rich gas from the reactor effluent and through a grooved preheat plug (not shown) where the hydrocarbon fraction is vaporized and the total stream is brought to the desired reaction temperature. The vapors pass downward through the longest set of distributing fins 9 and enter the first reaction zone, contacting the portion of catalyst charged in this zone. The vapors then pass through the space between the next set of fins and into the next reaction zone, contacting a second portion of the catalyst charge and undergoing additional conversion, then through the next set of fins and so on. The heat required to vaporize the hydrocarbon feed and preheat the total reactor feed to reactor temperature is supplied by heating means outside and adjacent to the reactor shell 20; the additional heat required by the dehydrogenation reaction is supplied by heating means outside the reactor shell 20 and additionally, if desired, by heating fluid circulated within the plug 6. The entire vapor stream is removed from the reactor and is separated into recycle gas and net product streams in the conventional manner.

I claim:

1. An annular reactor for handling divided contact material in fixed bed endothermic and exothermic chemical conversion processes which comprises an elongated cylindrically shaped tube, an elongated cylindrically shaped plug coaxially disposed within said tube, said plug and tube defining therebetween an annular reaction space, a plurality of fin-shaped members attached to said plug and extending radially outward from and lengthwise of said plug, said fin-shaped members being disposed in said reaction space in groups about said plug at a plurality of separate locations along said plug, each of said plurality of fin groups circumferentially surrounding said plug and constituting a fluid permeable support for divided contact material, the longitudinal spacings between fin groups being at least as great as the width of the annulus and the width of the annulus being greater than the spacing between confronting lengthwise faces of adjacent fins in each group of fins.

2. The reactor of claim 1 provided with heat exchange conduits in said plug.

3. The reactor of claim 1 wherein at least three fin groups are included at different locations along the plug and the distance between locations are of different lengths.

4. An annular reactor for handling divided contact material in fixed bed endothermic and exothermic chemical conversion processes which comprises an elongated cylindrically shaped tube, an elongated cylindrically shaped plug coaxially disposed within said tube, said plug and tube defining therebetween an annular reaction space, a plurality of fin-shaped members attached to said plug and extending radially outward from and lengthwise of said plug, said fin-shaped members being disposed in said reaction space in groups about said plug at a plurality of separate locations along said plug thereby defining separate reaction zones in said annular reaction space each of said plurality of fin groups circumferentially surrounding said plug and constituting a fluid permeable support for divided contact material, the confronting lengthwise faces of adjacent fins in each group being spaced from one another a distance not greater than the least dimension of the divided contact material to be employed in the reactor, inlet means in one end portion of said tube, outlet means in the other end portion of said tube, and temperature indicating means centrally disposed within said plug, the longitudinal spacings between fin groups being greater than the width of the annulus and the width of the annulus being greater than the spacing between confronting lengthwise faces of adjacent fins in each group of fins.

5. The reactor of claim 4 provided with heat exchange conduits in said plug.

6. The reactor of claim 4 wherein at least three fin groups are provided at different locations along the plug and the distance between adjacent locations are of different lengths.

References Cited in the file of this patent

UNITED STATES PATENTS

| 2,356,700 | Rupp et al. | Aug. 22, 1944 |
| 2,709,128 | Krause | May 24, 1955 |

FOREIGN PATENTS

| 132,571 | Great Britain | Sept. 25, 1919 |
| 283,869 | Great Britain | Nov. 5, 1927 |
| 591,669 | Great Britain | Aug. 26, 1947 |